(12) United States Patent
Lin

(10) Patent No.: US 10,664,414 B2
(45) Date of Patent: May 26, 2020

(54) CONTROLLER AND ADVANCED METHOD FOR DELETING DATA

(71) Applicant: Silicon Motion, Inc., Jhubei, Hsinchu County (TW)

(72) Inventor: Sheng-Liu Lin, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 178 days.

(21) Appl. No.: 15/868,635

(22) Filed: Jan. 11, 2018

(65) Prior Publication Data

US 2018/0349293 A1 Dec. 6, 2018

(30) Foreign Application Priority Data

Jun. 5, 2017 (TW) .............................. 106118499 A

(51) Int. Cl.
| | |
|---|---|
| *G06F 12/14* | (2006.01) |
| *G06F 3/06* | (2006.01) |
| *H04L 9/08* | (2006.01) |
| *G06F 21/60* | (2013.01) |
| *G06F 21/55* | (2013.01) |

(52) U.S. Cl.
CPC ........ *G06F 12/1408* (2013.01); *G06F 3/0623* (2013.01); *G06F 3/0652* (2013.01); *G06F 3/0658* (2013.01); *G06F 3/0679* (2013.01); *G06F 21/556* (2013.01); *G06F 21/602* (2013.01); *H04L 9/0891* (2013.01); *H04L 9/0894* (2013.01); *G06F 2212/1052* (2013.01); *G06F 2221/2107* (2013.01); *G06F 2221/2143* (2013.01)

(58) Field of Classification Search
CPC .. G06F 12/1408; G06F 3/0623; G06F 3/0652; G06F 3/0679; G06F 21/602; G06F 3/0658; G06F 2212/1052; G06F 2221/2107; G06F 2221/2143; G06F 21/556; G06F 11/1068; G06F 21/79; H04L 9/0894; H04L 9/0891
See application file for complete search history.

(56) References Cited

U.S. PATENT DOCUMENTS

| | | | | |
|---|---|---|---|---|
| 7,475,254 | B2 * | 1/2009 | Craft ..................... | G06F 21/123 713/187 |
| 8,461,863 | B2 * | 6/2013 | Pedersen ............... | G06F 21/554 326/8 |
| 9,270,469 | B2 * | 2/2016 | Moore .................. | H04L 9/3236 |
| 9,659,191 | B2 * | 5/2017 | Cope ....................... | G06F 21/79 |
| 10,218,503 | B2 * | 2/2019 | Cope ....................... | G06F 21/79 |
| 10,421,432 | B2 * | 9/2019 | Moore ............... | G07C 9/00857 |

(Continued)

*Primary Examiner* — Christopher A Revak
(74) *Attorney, Agent, or Firm* — McClure, Qualey & Rodack, LLP

(57) ABSTRACT

A controller for a data storage device is disclosed. The controller includes an encryptor and electronic fuses. The electronic fuses is provided for storage of a key which is supposed to be used by the encryptor to encrypt user data before storing the user data in the data storage device. When a user deletes the user data, the controller changes at least one bit of the key stored in the electronic fuses from '0' to '1'. Due to the change of the key stored in the electronic fuses for the encryptor, the deleted user data is fully prevented from leaking from the data storage device. A data storage device with a high confidential level is achieved.

10 Claims, 3 Drawing Sheets

(56) References Cited

U.S. PATENT DOCUMENTS

| | | | |
|---|---|---|---|
| 2009/0267636 A1* | 10/2009 | Choi | G11C 17/16 326/8 |
| 2015/0089245 A1 | 3/2015 | Altman et al. | |
| 2015/0293858 A1 | 10/2015 | Raam | |
| 2015/0312036 A1 | 10/2015 | Kumar | |
| 2016/0217304 A1 | 7/2016 | Ali et al. | |
| 2016/0344545 A1 | 11/2016 | Chou | |
| 2017/0060595 A1* | 3/2017 | Keidar | G06F 9/4401 |
| 2017/0132429 A1 | 5/2017 | Bell et al. | |

* cited by examiner

CONTROLLER AND ADVANCED METHOD FOR DELETING DATA

CROSS REFERENCE TO RELATED APPLICATIONS

This Application claims priority of Taiwan Patent Application No. 106118499, filed on Jun. 5, 2017, the entirety of which is incorporated by reference herein.

BACKGROUND OF THE INVENTION

Field of the Invention

The present invention relates to a method for deleting data, and particularly to a method for preventing the deleted data from data leakage.

Description of the Related Art

There are various forms of nonvolatile memory (NVM) used in data storage devices for long-term data retention, such as a flash memory, magnetoresistive RAM, ferroelectric RAM, resistive RAM, spin transfer torque-RAM (STT-RAM), and so on.

For the user, how the user data is properly stored in the data storage device and how the (confidential) user data is completely deleted from the data storage device are of equal importance. However, the importance of the second issue (completely deleting user data) has not been taken seriously by manufacturers of data storage devices. The deleted user data may be stolen from the storage space, resulting in data leakage. There is a strong need for users to completely delete user data in a data storage device.

BRIEF SUMMARY OF THE INVENTION

A controller in accordance with an exemplary embodiment of the disclosure includes: an instruction processor receiving user data from an external device; electronic fuses storing a key; an encryptor encrypting the user data based on the key to generate encrypted data; and a flash memory controller storing the encrypted data to a flash memory. The instruction processor changes at least one bit data '0' in the key stored in the electronic fuses to '1' when receiving a delete instruction from the external device.

In another exemplary embodiment of the disclosure, an advanced method for deleting data, comprising: setting the length of a key; using electronic fuses to store the key; encrypting user data by the key to generate encrypted data; and changing at least one bit data '0' in the key stored in the electronic fuses to '1' when deleting user data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

A nonvolatile memory may be a memory device for long-term data retention such as a flash memory, a magnetoresistive RAM, a ferroelectric RAM, a resistive RAM, a spin transfer torque-RAM (STT-RAM) and so on. The following discussion uses flash memory in particular as an example.

The flash memory is often used as a storage medium in today's data storage devices, for implementations of a memory card, a USB flash device, an SSD and so on. In another exemplary embodiment, the flash memory is packaged with a controller to form a multiple-chip package and named eMMC.

A data storage device using a flash memory as a storage medium can be applied to a variety of electronic devices, including a smartphone, a wearable device, a tablet computer, a virtual reality device, etc. A central processing unit (CPU) of an electronic device may be regarded as a host operating a data storage device equipped on the electronic device.

Figure 1:
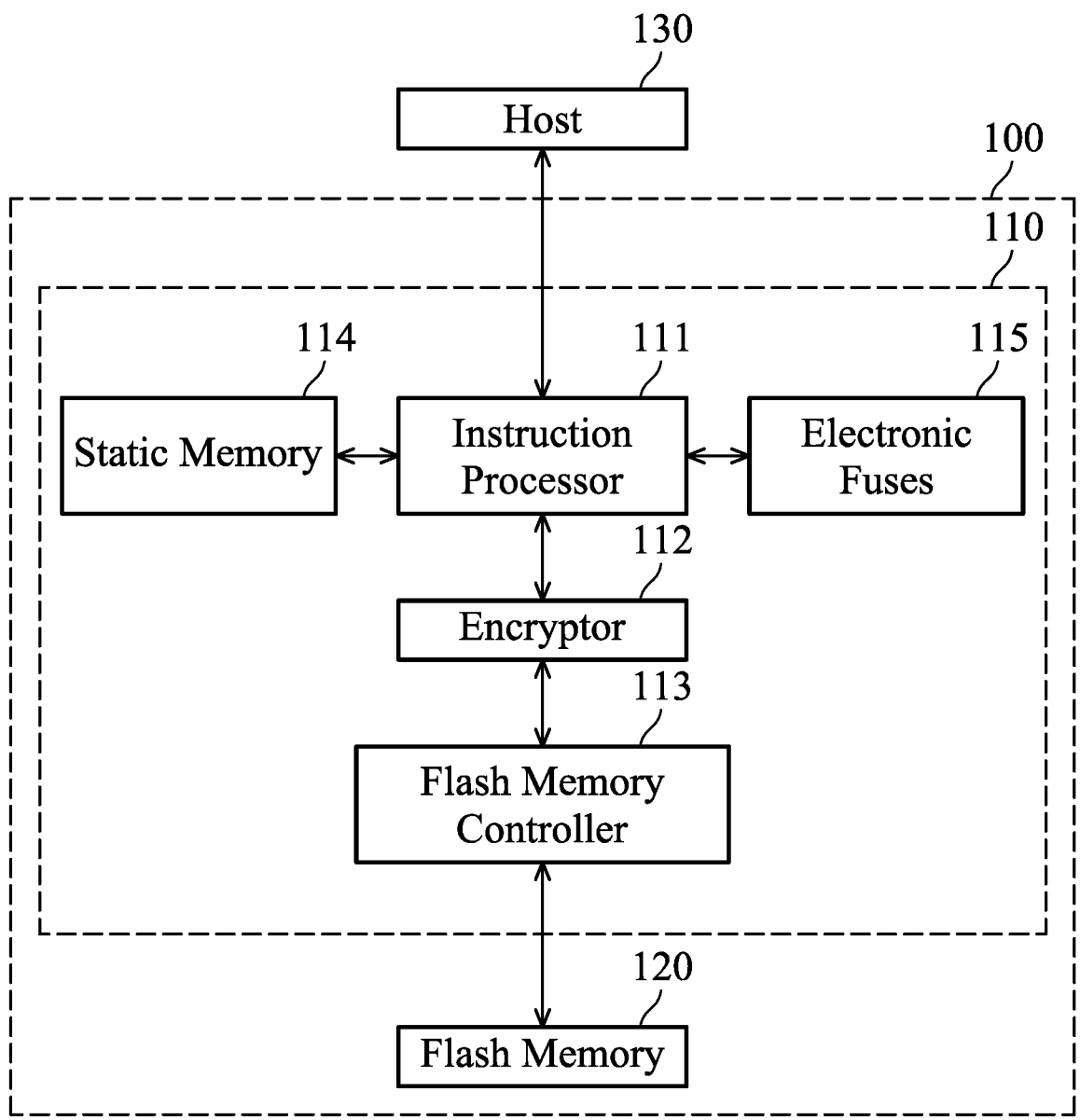
FIG. 1 is a block diagram depicting a data storage device 100 in accordance with an exemplary embodiment of the disclosure.

FIG. 1 is a block diagram depicting a data storage device 100 in accordance with an exemplary embodiment of the disclosure. The data storage device 100 comprises a controller 110 and a flash memory 120. The controller 110 includes an instruction processor 111, an encryptor 112, a flash memory controller 113, a static memory 114 and electronic fuses 115.

The instruction processor 111 is provided for the communication between the data storage device 100 and a host 130, which operates a connection bus as a communication interface for transmission of instructions and user data. In an exemplary embodiment, the host 130 transmits instructions (hereinafter external instructions) compliant with the spec of NVMe technology to the instruction processor 111 of the data storage device 100. The instruction processor 111 may translate or schedule the external instructions. The instruction processor 111 may schedule the external instructions according to the priority setting of the external schedule or a receiving order of the external instructions, and temporarily store the external instructions and user data in the static memory 114. Rather than receiving external instructions provided from the host 130 and compliant with the spec of NVMe, in other exemplary embodiments, the instruction processor 111 receives external instructions compliant with spec of an ATA (advanced technology attachment), PATA (Parallel ATA), SATA (Serial ATA), SCSI (Small Computer System Interface), eMMC, or UFS technology.

The instruction processor 111 transmits the user data to the encryptor 112. The encryptor 112 encrypts the user data according to a key and an encrypting mechanism to generate encrypted user data (hereinafter referred to as encrypted data), and transmits the encrypted data to the flash memory controller 113 to be written to the flash memory 120 by the flash memory controller 113. Storage of user data, therefore, is accomplished. The encryption mechanism may be an Advanced Encryption Standard (AES) or RSA encryption algorithm and at least one key is required. The encryptor 112 may additionally generate correction code for the encrypted data to protect the encrypted data using an error correction technology. In an exemplary embodiment, the encryptor 112 generates correction code for the user data first and then encrypts the user data and the correction code according to the key and the encryption mechanism to generate the encrypted data. The correction code may be Low Density Parity Check (LDPC) code or a Bose-Chaudhuri-Hocquenghem (BCH) code.

In addition, the encryptor 112 may randomize the encrypted data to make equal distribution of bit data '1' and '0' in the encrypted data. In some exemplary embodiments, the encryptor 112 encrypts the user data first and generates correction code accordingly. The randomization is made after the correction code has been attached to the encrypted data. The encryptor 112 may adopt another sequence to perform the steps of data processing, which is not limited thereto.

The encryptor 112 may be placed outside the instruction processor 111. In another exemplary embodiment, the encryptor 112 may be provided within the instruction processor 111 for more flexibility in scheduling the encryption, correction code generation and randomization of user data, achieving full compliance with user requirements. The encryptor 112 or the instruction processor 111 outputs the encrypted data to the flash memory controller 113. The flash memory controller 113 writes the encrypted data to the flash memory 120 and stores the mapping information that maps logical address of the encrypted data to physical storage address to a mapping table H2F (abbreviated from Host to Flash).

According to the reverse procedure, the encrypted data stored in the flash memory 120 can be decrypted into the user data by a decryption device (which may be integrated into the encryptor 112) and output to the instruction processor 111.

It can be seen from the foregoing that the key is necessary for the encryptor 112 to decrypt the encrypted data retrieved from the flash memory 120. If the value of the key is changed, this will cause the encryptor 112 to fail to correctly decrypt or read the encrypted data and data leakage is prevented.

Figure 2:
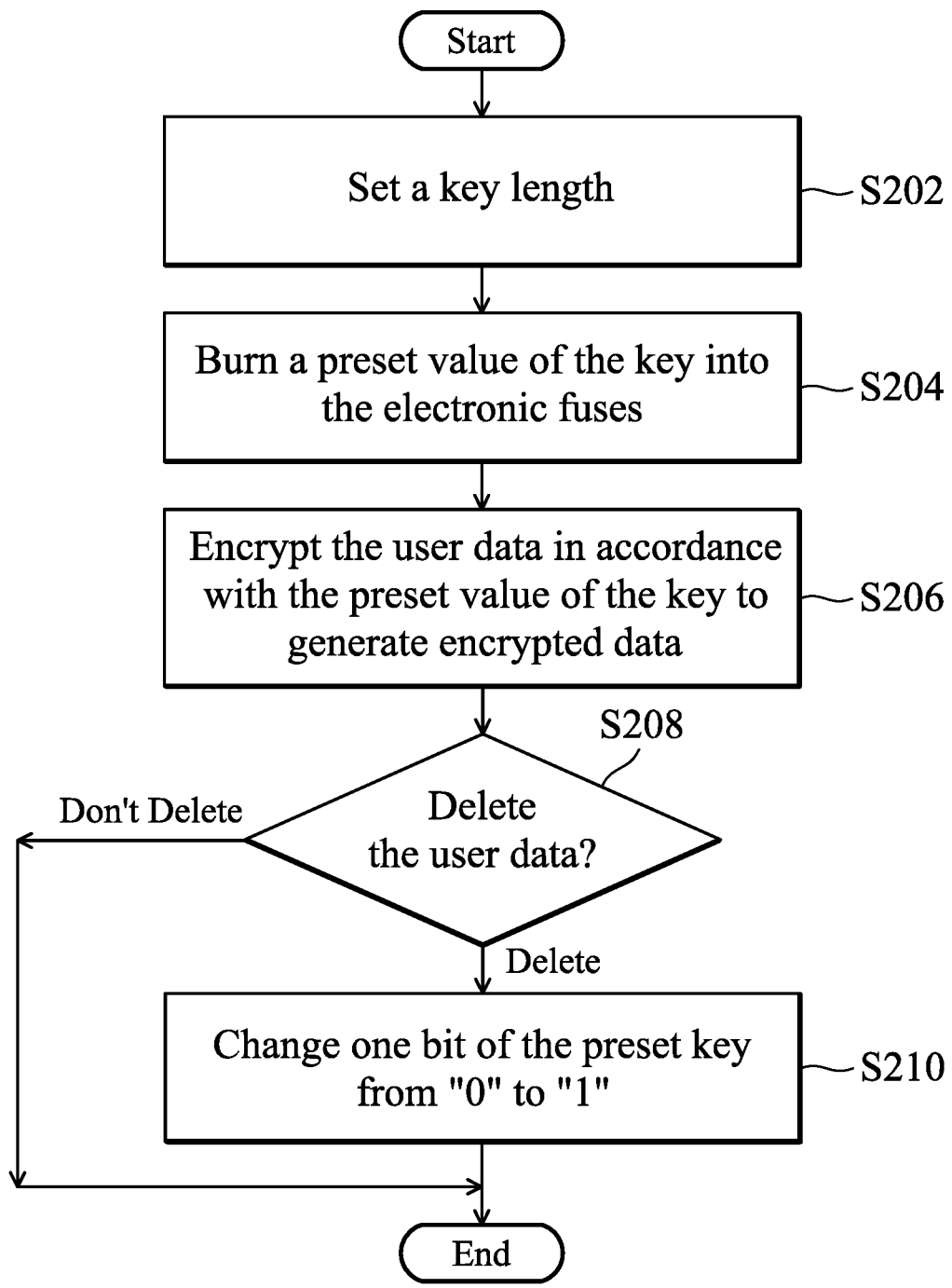
FIG. 2 is a flowchart depicting an advanced method for deleting data in accordance with an exemplary embodiment of the disclosure.

FIG. 2 is a flowchart depicting an advanced method for deleting data in accordance with an exemplary embodiment of the disclosure. In step S202, a key length is set. In addition to be provided for key storage, the electronic fuses may further store address indicating the key and the length of the key may. In the following example, the length of the key is 8 bits, but not limited thereto.

Figure 3:
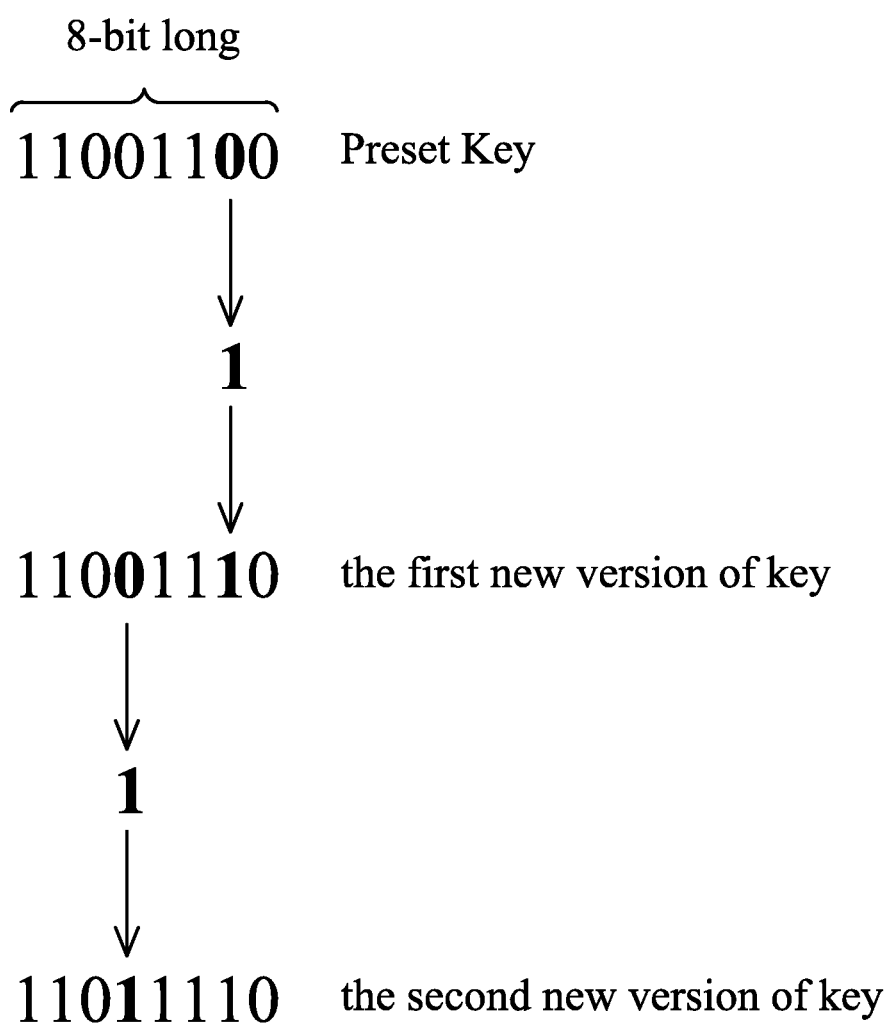
FIG. 3 illustrates an example showing how the preset key is changed to really avoid the deleted user data from data leakage.

In step S204, a preset value of the key is burned into the electronic fuses. The preset value of the key may be entered to the data storage device 100 during the manufacturing process or the first initialization process of the data storage device 100. The preset value of the key may be entered to the data storage device 100 by the user. In an exemplary embodiment, the preset value of the key is burned into the electronic fuses by an initialization program according to a key address indicating the electronic fuses. As shown in FIG. 3, the preset value of the key may be "11001100".

In step S206, the user data is encrypted in accordance with the preset value of the key to generate the encrypted data. The encryption procedure is executed by the encryptor 112 to encrypt the user data by the preset value of the key. The encryptor 112 may temporarily store the encrypted data in the static memory 114 or output the encrypted data to the flash memory controller 113.

In step S208, it is determined whether to delete the user data. If yes, step S210 is performed. Otherwise, the flow ends. The host 130 may output a secure erase instruction or a sanitizing instruction to the data storage device 100 to completely or partially delete user data from the data storage device 100. The target to be deleted may be the entire data storage device 100. In some exemplary embodiments, the host 130 selectively deletes a specific directory or namespace of the data storage device 100.

In step S210, one bit of the preset key is changed from "0" to "1". Only one time of change is allowed on an electronic fuse. For any bit presenting bit data '0' in the preset key, no more change can be made on the bit after bit data '1' is burned into the corresponding electronic fuse to replace the bit data '0'. FIG. 3 illustrates an example showing how the preset key is changed to really avoid the deleted user data from data leakage. As shown in FIG. 3, when the user wants to delete user data, the instruction processor 111 randomly selects one bit data '0' from the preset value of the key and changes the bit to '1'. In the exemplary embodiment shown in FIG. 3, the key is changed from a preset value "11001100" to "11001110". The new key is used by the encryptor 112 in the subsequent user data encryption and decryption. When the user wants to delete user data again, the similar modification is repeated on the key again. The instruction processor 111 randomly replaces another bit data '0' by bit data '1'. As shown, the key is further changed from "11001110" to "11101110". The newer version of key "11101110" is used i by the encryptor 112 in the subsequent user data encryption and decryption. Since the bit data "0" to be changed is selected randomly, there is no way to get the new version of key from the preset value of the key and way of key modification is protected. User data, therefore, is well protected. In this manner, the user data deleted by breaking the mapping relationship between logical addresses and physical addresses but still contained in the flash memory 120 is well protected. In other exemplary embodiments, more than one bit is selected to be changed from '0' to '1'. For example, two bits of '0' are randomly selected to be changed to '1'. In some exemplary embodiments, the key is scanned in a particular order (from front to back or from back to front) for selection of the bit(s) to be changed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller, comprising:
   an instruction processor, receiving user data from an external device;
   electronic fuses, storing a key;
   an encryptor, encrypting the user data based on the key to generate encrypted data; and
   a flash memory controller, storing the encrypted data to a flash memory,
   wherein:
   the instruction processor changes at least one bit data '0' in the key stored in the electronic fuses to '1' to invalidate an old version of the key and generate a modified key when receiving a delete instruction from the external device;

the delete instruction is for deleting user data; and the modified key is used by the encryptor in subsequent user data encryption.

2. The controller as claimed in claim 1, wherein:

the key has a length limit.

3. The controller as claimed in claim 1, wherein:

the at least one bit data '0' to be changed to '1' is selected from the key stored in the electronic fuses randomly.

4. The controller as claimed in claim 1, wherein:

the at least one bit data '0' to be changed to '1' is selected from the key stored in the electronic fuses in a specific order.

5. The controller as claimed in claim 1, wherein:

the encryptor further generates correction code for the user data.

6. The controller as claimed in claim 1, wherein:

the encrypted data is further randomized.

7. An advanced method for deleting data, comprising:

setting a length of a key;

using electronic fuses to store the key;

encrypting user data by the key to generate encrypted data;

changing at least one bit data '0' in the key stored in the electronic fuses to '1' to invalidate an old version of the key and generate a modified key when deleting user data; and using the modified key in subsequent user data encryption.

8. The advanced method as claimed in claim 7, wherein:

the at least one bit data '0' to be changed to '1' is selected from the key stored in the electronic fuses randomly.

9. The advanced method as claimed in claim 7, wherein:

the at least one bit data '0' to be changed to '1' is selected from the key stored in the electronic fuses in a specific order.

10. The advanced method as claimed in claim 7, further comprising:

generating correction code for the user data.

* * * * *